July 21, 1970 Z. FRENTRESS 3,521,040

PULSE SOURCE

Filed March 10, 1966 2 Sheets-Sheet 1

INVENTOR
Zane Frentress

BY: Newton, Hopkins, Jones & Ormsby

ATTORNEYS

July 21, 1970 Z. FRENTRESS 3,521,040

PULSE SOURCE

Filed March 10, 1966 2 Sheets-Sheet 2

INVENTOR
Zane Frentess

BY:

ATTORNEYS

United States Patent Office 3,521,040

Patented July 21, 1970

3,521,040

PULSE SOURCE

Zane Frentress, Chamblee, Ga., assignor, by mesne assignments, to Deering Milliken Research Corporation, Spartanburg, S.C., a corporation of South Carolina Filed Mar. 10, 1966, Ser. No. 533,338
Int. Cl. G06f *5/02;* H03k *13/24*
U.S. Cl. 235—155 8 Claims

ABSTRACT OF THE DISCLOSURE

A binary to decimal conversion system to supply successive series of output pulses that are decimally equivalent to successive groups of binary coded characters corresponding to predetermined numbers to a plurality of utilization devices. A converter having a plurality of elements with an initial and a plurality of alternate states, the latter corresponding to predetermined groups of binary coded characters, is used in conjunction with a controller operative to connect selected ones of the plurality of elements alternately with the remaining plurality of elements to the successive groups of binary coded characters. A distributor selectively distributes successive groups of binary coded characters to those elements of the converter connected by the controller means to the groups of binary coded characters to cause each of those elements to be set to the alternate state corresponding to the applied group of binary coded characters and the controller is further operative to cause the elements not connected thereby to the source of binary coded characters to permit that number of output pulses to be provided to individual utilization devices connected thereto that correspond to the alternate states to which the not connected elements are set by the distributor. Logic means are connected to reset each element to the initial state after that number of pulses decimally equivalent to the applied binary coded characters is applied to its associated utilization device. In the system, the output pulses are simultaneously supplied to the individual utilization means of elements not connected by the controller to the source of successive groups of binary coded characters.

This invention relates to a pulse source and, more particularly to a pulse source which provides electrical pulses which are in number decimally equivalent to binary coded characters.

There is a frequent requirement in the electrical and related arts for a pulse source which will provide a number of electrical pulses which is the decimal equivalent of a binary coded character. This is because electrical pulses which vary in number in a predetermined manner provide a convenient means for controlling pulse responsive devices such as stepping motors and because binary coded characters are a convenient means for storing information in a computer, on a magnetic tape, or in many other conventional storage means. However, in the prior art, pulse sources have frequently been limited in flexibility and reliability. Moreover, they have often been so complex in concept and arrangement as to be expensive to manufacture and maintain.

The invention disclosed herein overcomes these and other difficulties encountered in the prior art by providing a pulse source which is flexible, reliable, and relatively simple in concept and arrangement, but which nevertheless efficiently and rapidly provides that number of electrical pulses which is the decimal equivalent of any of a plurality of binary coded characters. Moreover, the invention provides electrical pulses corresponding to a binary coded character in sequence or simultaneously with electrical pulses corresponding to one or more other binary coded characters.

In addition, the invention provides pulse output whose occurrence is completely controlled since each pulse output consisting of the number of electrical pulses corresponding to a binary coded character occurs only upon the operation of a pulse output switch. However, in spite of the positive control over the occurrence of each pulse output which is provided, high rates of operation are easily achieved since the invention is conveniently arranged to store one or more binary coded characters simultaneously with the occurrence of one or more pulse outputs corresponding to previous binary coded characters.

These improvements in a pulse source are provided by a pulse source comprising a converter for converting information in terms of binary coded characters into pulse outputs each having a number of pulses which is the decimal equivalent of a binary coded character. The operation of the converter is controlled by a controller which controls the storage by the converter of inputs in terms of binary coded characters and the output by the converter of pulse outputs. The converter is arranged to provide for the sequential storing of information in terms of a plurality of binary coded characters and for the simultaneous output of pulse outputs corresponding to these binary coded characters.

The sequential storing of information in the form of binary coded characters by the converter is provided by a distributor which distributes information within the converter and the converter is arranged simultaneously to store information in terms of binary coded characters and to provide pulse outputs corresponding to previous information in terms of binary coded characters. From this brief description of the invention, it will be seen that the invention provides a highly versatile source of controlled electrical pulses for use as an input to any of a variety of pulse responsive devices.

These and other features and advantages of the invention will be more clearly understood from the following detailed description and the accompanying drawing in which like characters designate corresponding parts throughout and in which.

These figures and the following detailed description disclose a specific embodiment of the invention but the invention is not limited to the details disclosed since it may be embodied in other equivalent forms.

Figure 1:
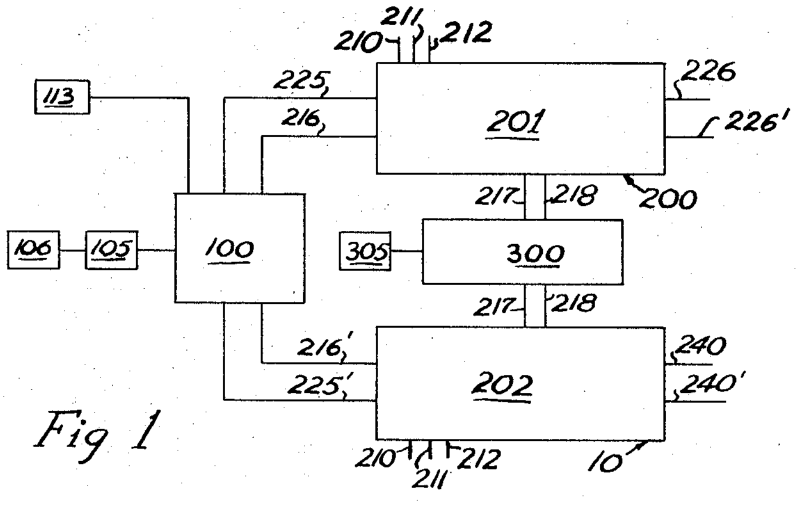
FIG. 1 is a block diagram of an embodiment of the pulse source.

That embodiment of the invention disclosed herein is generally shown in FIG. 1 and the invention is most easily understood as a pulse source 10 comprising a controller 100, a converter 200, and a distributor 300. The converter 200 provides a means for storing information in terms of binary coded characters and for converting such information into a pulse output having those numbers of pulses which are the decimal equivalents of the binary coded characters, and the converter 200 includes two pulse generating units 201 and 202 which are identical to each other. Thus, only one pulse generating unit 201 is shown in detail in FIG. 3 and from FIG. 3, it will be seen that the pulse generating unit 201 comprises a plurality of bi-stable element groups 203 and 204. The number of bi-stable elements 205, 206 and 207 in the bi-stable element group 203 and the number of bi-stable elements 205', 206' and 207' in the bi-stable element group 204 is dependent upon the number of binary digits in the binary coded characters which are to be used as the input to the pulse source 10, and the number of bi-stable element groups 203 and 204 is dependent upon the number of pulse outputs which are to be provided simultaneously.

Figure 3:
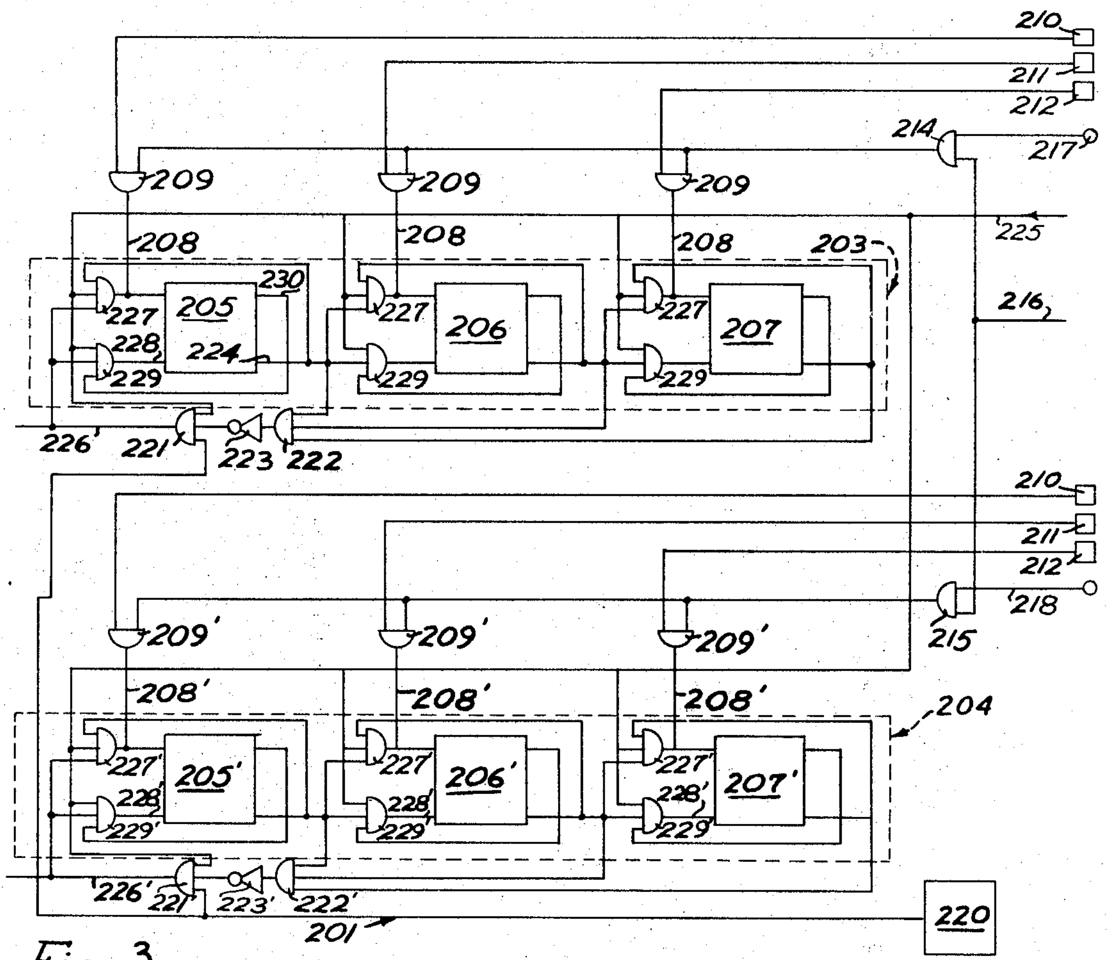
FIG. 3 is a schematic diagram of one of the pulse generating units in the converter of the pulse source.

Thus, the pulse generating unit 201 shown in FIG. 3 is adapted for binary coded characters which contain three binary digits and for providing two pulse outputs simultaneously. However, it should be understood that the number of bi-stable elements 205, 206, 207, 205', 206' and 207' in the bi-stable element groups 203 and 204 may be increased to permit binary coded characters having more than three binary digits to be used, and that the number of bi-stable element groups 203 and 204 may be increased to provide for more than two simultaneous pulse outputs.

One input terminal 208 of each of the three bi-stable elements 205, 206 and 207 in the bi-stable element group 203 is connected through a two-input *and* gate 209 to a reading head 210, 211 or 212 of a tape reader (not shown) or to a similar conventional device for providing an input corresponding to binary digit. Similarly, one input terminal 208' of each of the bi-stable elements 205', 206' and 207' in the bi-stable element group 204 is connected through a two-input *and* gate 209' to the reading head 210, 211 or 212. The arrangement is such that an electrical pulse caused by a binary digit read by the reading head 210 is simultaneously fed to a two-input *and* gate 209 connected to the input terminal 208 of the bi-stable element 205 and to a two-input *and* gate 209' connected to the input terminal 208' of the bi-stable element 205'. Similarly, an electrical pulse caused by a binary digit read by the reading head 211 is simultaneously fed to a two-input *and* gate 209 connected to input terminal 208 of the bi-stable element 206 and to a two-input *and* gate 209' connected to the input terminal 208' of the bi-stable element 206', and an electrical pulse caused by a binary digit read by the reading head 212 is simultaneously fed to a two-input *and* gate 209 connected to the input terminal 208 of the bi-stable element 207 and to a two-input *and* gate 209' connected to the input terminal 208' of the bi-stable element 207'.

Thus, it will be understood that each binary digit in successive binary coded characters read by the reading heads 210, 211 and 212 causes an electrical pulse to be fed or not fed to a two-input *and* gate 209 connected to a bi-stable element 205, 206 or 207 in the bi-stable element group 203 and simultaneously to a corresponding two-input *and* gate 209' connected to a bi-stable element 205', 206' or 207' in the bi-stable element group 204. Whether an electrical pulse is or is not fed to a two-input *and* gate 209 or 209' is dependent in conventional manner upon the nature of the binary digit.

It is by selectively providing a second input to the two-input *and* gates 209 and 209' that the electrical pulses caused by binary digits in successive binary coded characters alternately pass through the two-input *and* gates 209 into the bi-stable elements 205, 206 and 207 and through the two-input *and* gates 209' into the bi-stable elements 205', 206' and 207'. This selective second input to the two-input *and* gates 209 and 209' is provided through the two-input *and* gates 214 and 215 which have a common input at 216 from the controller 100. The second input to two-input *and* gates 214 and 215 is provided at 217 and 218 respectively from the distributor 300.

Thus, if the pulse generating unit 201 has an input at 216 from the controller 100 and is provided with inputs at 217 and 218 in sequence from the distributor 300, the two inputs required at the two-input *and* gates 214 and 215 are provided in sequence to the two-input *and* gates 214 and 215. As will be understood from the description of the distributor 300 below, these sequential inputs 217 and 218 at the two-input *and* gates 214 and 215 are coordinated with the passage of successive binary coded characters beneath the reading heads 210, 211, and 212 so that electrical pulses caused by one binary coded character correspond in time at the two-input *and* gates 209 with a second input from the two-input *and* gate 214 caused by the input at 217 and the electrical pulses caused by the next binary coded character correspond in time at the two-input *and* gates 209' with a second input from the two-input *and* gate 215 caused by the input at 218.

With all of the bi-stable elements 205, 206, 207, 205', 206' and 207' in the same initial stable state and responsive to an input at the input terminals 208 and 208', the presence of an input at a two-input *and* gate 209 or 209' from both a reading head 210, 211 or 212 and a two-input *and* gate 214 or 215 causes the bi-stable element to which the two-input *and* gate 209 or 209' is connected to change from its initial stable state to its alternate stable state. Similarly, the absence of an input from a reading head 210, 211 or 212 at a two-input *and* gate 209 or 209' in the presence of an input from a two-input *and* gate 214 or 215 will not influence a bi-stable element.

Thus, the stable state conditions of the bi-stable elements 205, 206 and 207 in the bi-stable element group 203 subsequent to simultaneous inputs at 216 and 217 and from reading heads 210, 211 and 212 are dependent upon the binary coded character which was read by the reading heads 210, 211 and 212 simultaneously with the inputs at 216 and 217. Similarly, the stable state conditions of the bi-stable elements 205', 206' and 207' in the bi-stable element group 204 subsequent to simultaneous inputs at 216 and 218 and from reading heads 210, 211 and 212 are dependent upon the binary coded character which was read by the reading heads 210, 211 and 212 simultaneously with the inputs at 216 and 218.

For example, a binary coded character of 101 causes the bi-stable elements 205, 206 and 207 to be in their alternate, initial, and alternate stable states respectively. It is these and similar changes in the stable states of the bi-stable elements 205, 206, 207 and similar changes in the bi-stable elements 205', 206', and 207' which are used in the bi-stable element groups 203 and 204 to provide pulse outputs containing that number of electrical pulses which is the decimal equivalent of a binary coded character. This will be understood by considering the bi-stable element group 203 in further detail.

Each pulse generating unit 201 and 202 includes a pulse generator 220 having a pulsing output which continuously provides a pulsing input to three-input *and* gate 221 in the bi-stable element group 203. A second input to this three-input *and* gate 221 is provided from a three-input *and* gate 222 through an inverter 223 which serves to provide an input at the three-input *and* gate 221 only when the three inputs to the three-input *and* gate 222 are dissimilar. The three inputs to the three-input *and* gate 222 are from the initial stable state output terminals 224 of the three bi-stable elements 205, 206 and 207 in the bi-stable element group 203. Thus, when the bi-stable elements 205, 206 and 207 are placed in different stable states in response to the binary digits in a binary coded character, there is a second input at the three-input *and* gate 221 to supplement the continuous input from the pulse generator 220. The third input required at the three-input *and* gate 221 is provided at 225 from the controller 100. The controller 100 provides an input at 225 alternately with the input at 216 and with the input from the three-input *and* gate 222, this input at 225 to the three-input *and* gate 221 causes a pulsing output at 226 from the three-input *and* gate 221 in response to pulses from the pulse generator 220.

Each input terminal 208 of the bi-stable elements 205, 206 and 207 is connected to the output of a three-input *and* gate 227 and a second input terminal 228 of each bi-stable element 205, 206 and 207 is connected to the output of a three-input *and* gate 229. One input to each of the three-input *and* gates 227 is from the output terminal 224 corresponding to the other input terminal 228 of the same bi-stable element 205, 206 and 207. Similarly, one input to each of the three-input *and* gates 229 is from the output terminal 230 corresponding to the other input terminal 208 of the same bi-stable elements 205, 206 and 207. A second input to all of the three-input *and* gates 227 and 229 is provided by the input at 225 from the controller 100 and a third input to the three-input *and* gates 227 and 229 connected to the input terminals 208 and 228 of the bi-stable element 205 is provided by the output of the three-input *and* gate 221. Thus, with an input at 225 and a pulsing output at the three-input *and* gate 221, the bi-stable element 205 changes its stable state in response to each pulse from the pulse generator 220.

The output at the output terminal 224 of the bi-stable element 205 is not only to the three-input *and* gate 222 but also to the three-input *and* gates 227 and 229 connected to the input terminals 208 and 228 of the bi-stable element 206, and at these three-input *and* gates 227 and 229 provides a third input when there is an input at 225. As a result, the bi-stable element 206 changes its stable state in response to the output at the output terminal 224 of the bi-stable element 205. Similarly, the output at the output terminal 224 of the bi-stable element 206 is not only to the three-input *and* gate 222 but also to the three-input *and* gates 227 and 229 connected to the input terminals 208 and 228 of the bi-stable element 207 where it causes a change in the stable state of the bi-stable element 207 in response to the output at the output terminal 224 of the bi-stable element 206.

Those familiar with the art will understand this arrangement of bi-stable elements 205, 206 and 207 as an arrangement responsive to the pulsing output at the three-input *and* gate 221 and in which all of the bi-stable elements 205, 206 and 207 are in their initial stable states only after that number of electrical pulses from the pulse generator 220 which correspond decimally to the binary coded character represented by their stable states prior to the electrical pulses. It will also be understood that when all of the bi-stable elements 205, 206 and 207 are placed in their initial stable states, the input to the three-input *and* gate 221 from the three-input *and* gate 222 is removed and there is no further pulsing output at the three-input *and* gate 221 to the bi-stable element group 205 and at the output 226. Thus, the number of electrical pulses at the output 226 is the number of pulses which is the decimal equivalent of the binary coded character used to change the stable states of the bi-stable elements 205, 206 and 207 prior to the pulses from the pulse generator 220.

One pulse output of the pulse source 10 is the output 226 and a second and simultaneously provided output is the output at 226′ from the bi-stable element group 204 which is responsive to the same inputs at 216 and 225 as the bi-stable element group 203. The pulse generating unit 202 is alternately responsive with the pulse generating unit 201 to the insputs at 216′ and 225′ from the controller 100 and serves to provide simultaneous outputs 240 and 240′ which alternate with the simultaneous outputs 226 and 226′. These outputs 226, 226′, 240 and 240′ may be used to drive stepping motors (not shown) or other pulse responsive devices in a manner determined by the nature of the binary coded characters used as an input to the pulse source 10.

It will be understood that the outputs 226 and 226′ occur simultaneously with each other and that the outputs 240 and 240′ occur simultaneously with each other but alternately with the outputs 226 and 226′. It will also be understood that the simultaneous occurrence of the outputs 226 and 226′ or of the outputs 240 and 240′ is dependent upon the inputs 225 and 225′ respectively from the controller 100. Similarly, the receiving of binary coded characters by the pulse generating units 201 and 202 is dependent upon the inputs 216 and 216′ respectively from the controller 100. Thus, the controller 100 provides a means for controlling the time at which outputs 226, 226′, 240, 240′ occur and at which the pulse generating units 201 and 202 will receive and store binary coded characters. It also provides the means by which the pulse source 10 is rendered operative or inoperative.

Figure 2:
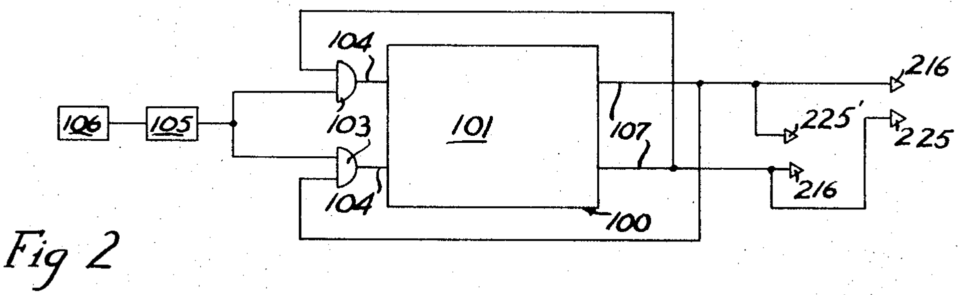
FIG. 2 is a schematic diagram of the controller of the pulse source.

The controller 100 of the pulse source 10 which provides the inputs at 216 and 225 for the pulse generating unit 201 and alternately at 216′ and 225′ for the pulse generating unit 202 is best seen in FIG. 2. From FIG. 2 it will be seen that the controller 100 comprises a bi-stable element 101 and that the bi-stable element 101 has a two-input *and* gate 103 connected to each of its input terminals 104. One input to both of the two-input *and* gates 103 is through a shaping element 105 from a pulse output switch 106. The other input to each of the two-input *and* gates 103 connected to an input terminal 104 is from the output terminal 107 corresponding to the other input terminal 104.

The pulse output switch 106 is a momentary closing switch of conventional type which serves to provide a pulse from a suitable voltage source (not shown) each time it is operated. It will now be understood by those skilled in the art that with the arrangement of the controller 100 described, the bi-stable element 101 changes its stable state each time the pulse output switch 106 operates and that an output is alternately provided at one and then the other of its output terminals 107. One output terminal 107 of the bi-stable element 101 provides the input 216 to the pulse generating unit 201 and the input 225′ to the pulse generating unit 202 and the other output terminal 107 of the bi-stable element 101 provides the input 216′ to the pulse generating unit 202 and the input 225 to the pulse generating unit 201.

Thus, it will be understood that the operation of the pulse output switch 106 serves to alternately enable one pulse generating unit 201 or 202 to receive binary coded characters while the other pulse generating unit 201 or 202 is providing an electrical pulse output in accordance with previous binary coded characters. It will also be understood that the two pulse generating units 201 and 202 permit operation of the pulse source at maximum efficiency since one pulse generating unit 201 or 202 is receiving binary coded characters while the other pulse generating unit 201 or 202 is providing an electrical pulse output in response to the operation of the pulse output switch 106. Thus, the pulse source 10 will provide pulse outputs, each having a number of pulses which is decimally equivalent to a binary coded character, at substantially any desired rate of operation of the pulse output switch 106.

Figure 4:
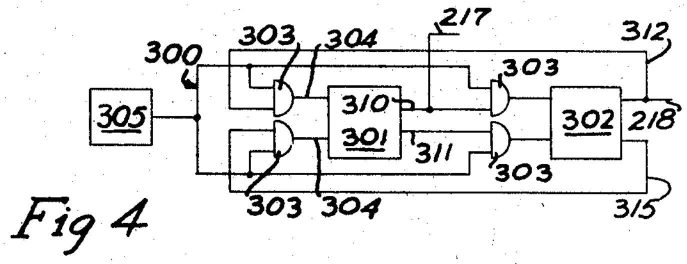
FIG. 4 is a schematic diagram of the distributor of the pulse source.

The distributor 300 of the pulse source 10 is the means for distributing successive binary coded characters in succession to the bi-stable element groups 203 and 204 in the pulse generating unit 201 when there is an input at 216 from the controller 100 and provides an identical function with respect to the pulse generating unit 202 when there is an input at 216′ from the controller 100. More specifically, the distributor 300 provides the inputs 217 and 218 by which the binary coded characters in a series of binary coded characters are distributed to selected bi-stable element groups 203 and 204 in the pulse generating unit 201 and selected bi-stable element groups 203′ and 204′ in the pulse generating unit 202. From FIG. 4, it will be seen that the distributor 300 comprises two bi-stable elements 301 and 302, each having a two-input *and* gate 303 connected to both of its input terminals 304. One input to all of the two-input *and* gates 303 is from a reading head 305 or from a similar device for providing a pulse which coincides with each successive binary coded character to be received in succession by the bi-stable element groups 203, 203′, 204 and 204′. Thus, there is a pulse input to every two-intput *and* gate 303 in the distributor 300 each time a binary coded character is read by the reading heads 210, 211 and 212.

The output terminals 310 and 311 of the bi-stable element 301 provide the second inputs to the two-input *and* gates 303 of the bi-stable element 302. Similarly, the output terminals 312 and 315 of the bi-stable element 302 provide the second inputs to the two-input *and* gates 303 of the bi-stable element 301. Thus, with each pulse input from the reading head 305 corresponding to a binary coded character, the bi-stable element 301 changes its stable state and the bi-stable element 302 changes its stable state. The input 217 to pulse generating units 201 and 202 is the output at output terminal 310 of the bi-stable element 301 and the input 218 to the pulse generating units 201 and 202 is the output at the output terminal 313 of the bi-stable element 302 at which there is an output in response to an input from the output terminal 311 of the bi-stable element 301.

Those skilled in the art will understand that this arrangement results in the inputs 217 and 218 occurring alternately in response to repeated inputs from the reading head 305 so that successive binary coded characters will pass to one and then the other bi-stable element group 203, 203', 204 and 204' in the pulse generating units 201 and 202. Those skilled in the art will also recognize that the distributor 300 may be expanded by the addition of bi-stable elements 301 and 302 and that the outputs 217 and 218 may be alternated with additional outputs in response to repeated inputs from the reading head 305. This permits embodiments of the pulse source 10 disclosed herein having more than two bi-stable element groups in each pulse generating unit 201 and 202 so that more than two simultaneous pulse outputs 226 and 226' or 240 and 240' are provided. Moreover, it should again be emphasized that the number of binary digits in each binary coded character and the variation in number of pulses in the outputs at 226, 226', 240, and 240' may be increased by simply adding additional bi-stable elements in each bi-stable element group 203, 203', 204, and 204'.

In operation, the pulse source 10 is provided with pulse inputs determined by a plurality of binary coded characters. Each of these binary coded characters is stored in sequence in the converter 200 in response to the distributor 300 and the converter 200 in response to the operation of the pulse output switch 106 of the controller 100 provides pulse outputs in sequence and simultaneously. In each pulse output the number of electrical pulses is the decimal equivalent of a binary coded character. These pulse outputs are simultaneously at 226 and 226' and alternately and simultaneously at 240 and 240' and may be used in a variety of combinations which will be obvious to those skilled in the art to provide the inputs to stepping motors (not shown) or other pulse responsive devices.

However, regardless of the pulse responsive device or devices to which the pulse outputs at 226, 226', 240 and 240' are provided, the occurrence of the pulse outputs is controlled by the controller 100 in response to the operation of the pulse output switch 106 and each pulse output corresponds to a binary coded character which is readily and easily provided from a magnetic tape, computer, or other conventional source of information in the form of binary coded characters. Moreover, the pulse source 10 disclosed converts information in the form of a binary coded character into a pulse output having a number of pulses which is the decimal equivalent of the binary coded character in a manner which is completely reliable and with apparatus which is relatively inexpensive to manufacture and maintain.

It will be obvious to those skilled in the art that many variations may be made in the embodiments chosen for the purpose of illustrating the present invention without departing from the scope thereof as defined by the appended claims.

What is claimed as my invention is:

1. A binary to decimal conversion system for supplying successive series of output pulses that are decimally equivalent to successive groups of binary coded characters to a plurality of utilization devices comprising:

a source of successive groups of binary coded characters corresponding to predetermined numbers, converter means having first and second groups of a plurality of bistable elements, each group having an initial and a plurality of alternate states, the latter corresponding to predetermined groups of binary coded characters, controller means operative to alternately connect the first and second groups of plurality of elements to the source of successive groups of binary coded characters, distributor means for selectively distributing successive groups of binary coded characters to the elements of the group of elements of the converter connected by the controller means to the source of groups of binary coded characters to cause those elements to be set to a bistable state corresponding to the applied group of binary coded characters, pulse generator means operative to supply a number of output pulses to individual utilization devices connected to the elements of the group of elements not connected by the controller means to the source of successive groups of binary coded characters corresponding to the bistable states to which those elements were last set by the distributor, logic means connected to reset each element to its initial bistable state after that predetermined number of pulses decimally equivalent to the applied binary coded characters is supplied to its associated utilization device.

2. The decimal to binary conversion system recited in claim 1 wherein output pulses are simultaneously supplied to the individual utilization means associated with the elements not connected by the controller to the source of successive groups of binary coded characters.

3. A binary to decimal conversion system for supplying successive series of output pulses decimally equivalent to successive groups of binary coded characters to selected utilization devices comprising:

a source of successive groups of binary coded characters corresponding to predetermined numbers, first and second pulse generating units, each comprising a plurality of counting circuits having an initial state and a plurality of alternate states, the latter corresponding to different groups of binary coded characters, controller means operative to alternately connect the source of successive groups of binary coded characters to the first and second pulse generating units, distributor means for selectively distributing successive groups of binary coded characters sequentially to the plurality of counting circuits of the pulse generating unit connected by the controller means to the source of successive groups of coded characters to cause them to be set from the initial state to the alternate state corresponding to the applied group of binary coded characters, the controller means being further operative to cause the pulse generating unit not connected thereby to the source of binary coded characters to permit a number of output pulses to be provided to individual utilization devices connected to the associated plurality of counting devices that correspond to the alternate states to which the latter are set by the distributor means, logic means connected to reset each of the counting means to the initial state after that number of pulses decimally equivalent to the applied binary coded characters is counted and supplied to the associated utilization device.

4. The binary to decimal conversion system recited in claim 3 wherein the output pulses are simultaneously supplied to the individual utilization means of the pulse generating unit not connected by the controller to the source of successive groups of binary coded characters.

5. A binary to decimal conversion system for supplying successive series of output pulses decimally equivalent to successive groups of binary coded characters to selected utilization devices comprising:

a source of successive groups of binary coded characters corresponding to predetermined numbers, first and second pulse generating units, each comprising first and second counting circuits having an initial state and a plurality of alternate states, the latter corresponding to different groups of binary coded characters, controller means operative to alternately connect the source of successive groups of binary coded characters to the first and second pulse generating units, distributor means for selectively distributing successive groups of binary coded characters sequentially to the first and second counting circuits of the pulse generating unit connected by the controller means to the source of successive groups of coded characters to cause them to be set from the initial state to the alternate state corresponding to the applied group of binary coded characters, the controller means being further operative to cause the pulse generating unit not connected thereby to the source of binary coded characters to permit a number of output pulses to be provided to individual utilization devices connected to the associated first and second counting devices that correspond to the alternate states to which the latter are set by the distributor means, logic means connected to reset each of the counting means to the initial state after that number of pulses decimally equivalent to the applied binary coded characters is counted and supplied to the associated utilization device.

6. The binary to decimal conversion system recited in claim 5 wherein the output pulses are simultaneously supplied to the individual utilization means of the pulse generating unit not connected by the controller to the source of successive groups of binary coded characters.

7. A binary to decimal conversion system for supplying successive series of output pulses decimally equivalent to successive groups of binary coded characters to selected utilization devices comprising:

a source of successive groups of binary coded characters corresponding to predetermined numbers, first and second pulse generating units, each comprising first and second counting circuits having an initial state and a plurality of alternate states, the latter corresponding to different groups of binary coded characters, controller means operative to alternately connect the source of successive groups of binary coded characters to the first and second pulse generating units, distributor means for selectively distributing successive groups of binary coded characters sequentially to the first and second counting circuits of the pulse generating unit connected by the controller means to the source of successive groups of coded characters to cause them to be set from the initial state to the alternate state corresponding to the applied group of binary coded characters, pulse generator means operative to supply a number of output pulses to individual utilization devices connected to the first and second counting means of the pulse generating unit not connected by the controller means to the source of successive groups of binary coded characters corresponding to the alternate states to which they are set by the distributor, logic means connected to reset each of the counting means to the initial state after that number of pulses decimally equivalent to the applied binary coded characters is counted and supplied to the associated utilization device.

8. The binary to decimal conversion system recited in claim 7 wherein the output pulses are simultaneously supplied to the individual utilization means of the pulse generating unit not connected by the controller to the source of successive groups of binary coded characters.

References Cited

UNITED STATES PATENTS

| | | | |
|---|---|---|---|
| 3,319,054 | 5/1967 | Kelling | 235—154 |
| 2,927,313 | 3/1960 | Dickinson | 235—155 |
| 3,257,547 | 6/1966 | Bernstein | 235—155 |
| 3,350,708 | 10/1967 | Adler | 235—155 |

MAYNARD R. WILBUR, Primary Examiner

G. R. EDWARDS, Assistant Examiner

U.S. Cl. X.R.

235—92